United States Patent [19]

Deguara

[11] 4,347,910

[45] Sep. 7, 1982

[54] SAFETY APPARATUS FOR VEHICLES

[76] Inventor: Albert Deguara, C/-Post Office, Rosella, Qld., Australia, 4714

[21] Appl. No.: 180,906

[22] Filed: Aug. 25, 1980

[30] Foreign Application Priority Data

Sep. 25, 1979 [AU] Australia .............................. PE0639

[51] Int. Cl.³ ............................................ B60R 21/00
[52] U.S. Cl. ..................................... 180/268; 180/272
[58] Field of Search .............. 180/272, 273, 271, 268, 180/269, 270, 900; 200/61.58 B, 61.58 R

[56] References Cited

U.S. PATENT DOCUMENTS

| | | | |
|---|---|---|---|
| 747,370 | 12/1903 | Brislin | 105/341 |
| 1,399,552 | 12/1921 | Guignard et al. | 180/272 X |
| 2,250,754 | 7/1941 | Dooley | 180/273 |
| 4,209,075 | 6/1980 | Messina | 180/272 X |

Primary Examiner—Joseph F. Peters, Jr.
Assistant Examiner—Milton L. Smith
Attorney, Agent, or Firm—Schwartz, Jeffery, Schwaab, Mack, Blumenthal & Koch

[57] ABSTRACT

A safety apparatus for vehicles including a connection member interconnecting a seat belt or harness of a vehicle and a component or accessory of a vehicle. The apparatus is operable when an operator of the vehicle wearing the seat belt or harness slumps or otherwise makes an unexpected movement to thereby actuate the component or accessory to stop the vehicle. This occurs through movement of the connection member to engage or disengage the component or accessory. The connection member suitably includes a rigid component attached to the seat belt or harness and a flexible component attached to the component or accessory.

7 Claims, 2 Drawing Figures

SAFETY APPARATUS FOR VEHICLES

BACKGROUND OF THE INVENTION

This invention relates to a safety apparatus primarily intended for use in conjunction with a seat belt for a vehicle or harness wherein whenever the driver of the vehicle slumps in his seat or makes a similar unexpected movement the vehicle is rendered stationary, or a vehicle component or accessory to which the safety apparatus is attached is caused to engage or disengage.

It has long been considered that there has been a need for safety apparatus to be used in conjunction with a vehicle seat belt wherein when a driver is caused to be dislodged from his seat, or slip, be injured by an overhead or projecting surface, or suffer illness causing him to lose consciousness and thereby slump in his seat that he will in one example tension his seat belt and therefore cause the vehicle to stop. However to date no satisfactory safety device has been known which falls within these particular criteria.

It is therefore an object of the invention to provide safety apparatus for vehicles which meets the particular criteria described above.

SUMMARY OF THE INVENTION

The safety apparatus of the invention includes a connection member interconnecting a seat belt or harness of a vehicle and a component or accessory of the vehicle whereby when an operator of the vehicle wearing the seat belt or harness slumps or otherwise makes an unexpected movement the vehicle or accessory is actuated to stop the vehicle through movement of the connection member or otherwise to engage or disengage the component or accessory.

The invention is a board one and is capable of many applications. Thus for example if a driver of a vehicle which is stationary is operating an excavator or any other component having blades or teeth, then it is desirable that if he slumps in his seat that he does not suffer injury. In this embodiment the safety apparatus of the invention may be engaged with a vehicle component or accessory operating the excavator and therefore disengage with the component or accessory to prevent the excavator functioning. Alternatively the safety apparatus may engage with a vehicle accessory or component to prevent functioning of the excavator. In this embodiment the excavator could be connected to the power take-off of a tractor.

However, in most cases the invention is applicable to a moving vehicle and is designed to stop the vehicle. The invention is applicable to a vehicle seat belt or alternatively to a rigid harness worn by the driver of the vehicle or also by a vehicle passenger. In the former case the seat belt may tension and cause the vehicle to stop by engagement or disengagement of the vehicle accessory or component. In the latter case for example the connection member itself may include a resilient part which tensions upon slumping movement of the driver and therefore disengages or engages the vehicle component or accessory.

The vehicle component or accessory may include, for example, the vehicle gearbox, clutch, brakes, ignition or electrical system or as described above the power take-off of a tractor when the vehicle is stationary.

However, it is preferred that the invention be applied to a tractor having a fuel pump which is normally attached via a shut-off lever of the fuel pump to a control rod. The control rod is normally attached to the shut-off lever by a suitable linkage. However it must be emphasized that the invention is applicable to any other sort of a vehicle such as two or four wheel drives and which are powered by piston engines, diesel engines, rotary engines or any other suitable drive means.

The connection member may be a unitary member such as a cable or rod interconnecting the vehicle harness or seat belt or more preferably it may comprise a rigid component such as a rod and a flexible component such as a cable.

In a more preferred embodiment of the present invention the rigid component is attached to a vehicle seat belt rearwardly of the driver's seat and to a rearward extension of the seat belt. Thus in one form the seat belt may be rigidly attached to the driver's seat on both sides thereof and include a continuous strap which may encircle his neck. The rearward extension of the seat belt may then be attached to the neck portion of the seat belt.

In a more preferred form the seat belt may include two lap belts which are rigidly attached at outer ends respectively to an associated side of the driver's seat and are interconnected at their respective inner ends by a buckle adjacent the driver's stomach. The neck strap forming a continuous loop may then encircle the driver's neck. The free ends of the neck strap may then be attached to a respective lap belt at a location spaced from the interconnecting buckle.

BRIEF DESCRIPTION OF THE DRAWINGS

Reference is now made to a preferred embodiment of the invention as shown in the accompanying drawings which illustrate the safety apparatus constructed in accordance with the invention.

In these drawings.

DESCRIPTION OF THE PREFERRED EMBODIMENTS

Figure 1:
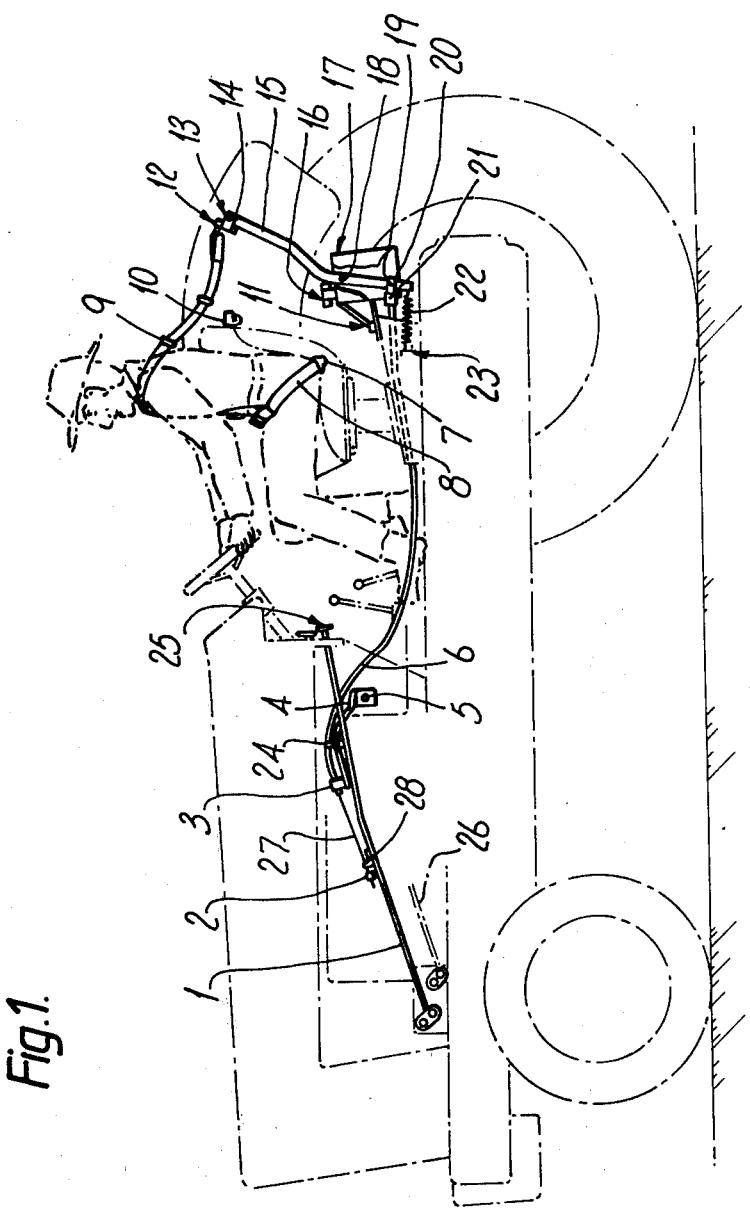
FIG. 1 represents a side view of the safety apparatus.

The safety apparatus illustrated includes a seat belt 8 having a harness 9 attached thereto which forms a rearwardly extending part as shown for attachment thereto of the rigid component which as shown comprises an actuating arm 15 which is attached to harness 9 by bolts 12 and 13 as shown. The actuating arm 15 is suitably vertically oriented and is pivotally attached to a suitable support member such as support housing or cabinet 17. Support member 17 includes a stop member 16 for limiting forward movement of arm 15. Arm 15 is pivotally attached to support member 17 by upper pivot bolt 18 and lower pivot bolt 19.

The bottom of the actuating arm 15 may also be rigidly attached to a flexible cable which extends through a lower part of the abovementioned support member 17. Preferably the rearward end of the flexible cable has a cable lock nut 21 for attachment to a clevis 20 which is attached to the bottom end of arm 15.

Suitably the actuating arm 15 is resiliently mounted to the vehicle seat support base and this may be accomplished in any suitable manner. Thus the bottom portion of the actuating arm may have a spring but more suitably two opposed springs 22 which extend on both sides of the abovementioned cable and which are each rigidly attached to the bottom portion of the actuating arm 15 and also to the vehicle chassis or other suitable support structure by lugs 23. The flexible cable may form a Bowden cable arrangement including a fixed outer cable 6 which acts as a guide for the inner cable 27 which is movable.

In the above-described embodiment one end of the outer cable 6 may be attached to the support member 17. The other end of the outer cable 6 may be attached to a bracket 4 attached to the steering box of the tractor behind the engine. Bracket 4 is attached to the vehicle by bolt 5 and by U-shaped bolt 24. Outer cable 6 is attached to bracket 4 by cable clamp 3. The inner cable is, as described previously, attached to the bottom part of the actuating arm 15 and also to the control rod 1 for the fuel pump of the vehicle. In this connection the control rod 1 may have a drilled bracket 28 attached to it through which the inner cable 27 passes. This inner cable may be provided with a stop 2 on its end.

Figure 2:
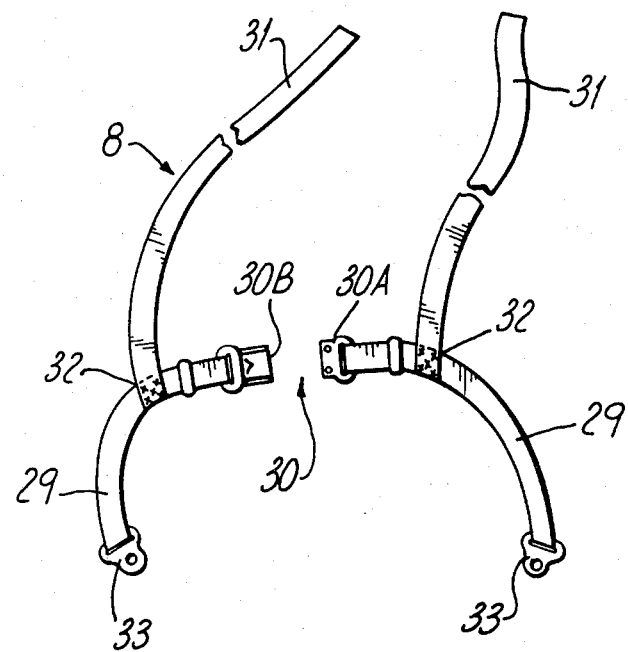
FIG. 2 represents a detailed view of the driver's seat belt or harness.

The safety belt 8 shown in FIG. 2 includes lap belts 29 which in use are rigidly attached at respective outer ends 33 to an associated side of the driver's seat and are each interconnected at their inner ends by buckle 30 including male component 30A and female component 30B. The neck strap 31 formed as a continuous loop encircles the driver's neck. The free ends of the neck strap are attached to an associated lap belt 29 at 32.

In operation of the safety apparatus of the invention and in particular to the preferred embodiment as described above, when the operator slumps in his seat the actuating arm 15 pivots frontwardly thereby pulling on the inner cable 27 whereby the stop 2 on the forward end of the inner cable 27 moves the control rod 1 of the fuel pump and therefore turns the fuel supply off cutting off the vehicle engine. At this stage the actuating arm 15 bears against the stop 16. The springs 22 attached to the bottom portion of the actuating arm 15 then return the inner cable 27 to its original or inoperative position after the driver's weight has been removed from the seat belt.

I claim:

1. Safety apparatus for a vehicle, comprising:
   (a) a seat belt or harness adapted to be worn by the operator of the vehicle,
   (b) a rigid actuating member attached at a first region thereof to said belt or harness and pivotally mounted at a second, lower region thereof to support means mounted on said vehicle, and
   (c) a flexible member attached at one end to said rigid actuating member and connected at its other end to a component or accessory of the vehicle the engagement or disengagement of which controls the movement of said vehicle,
   whereby when the operator slumps or makes an unexpected movement of rigid actuating member is pivoted thereby causing movement of said flexible member to engage or disengage said component or accessory.

2. Safety apparatus as claimed in claim 1 wherein said rigid actuating member is an arm or rod attachable to a rearward extension of the harness or seat belt, which arm or rod is substantially vertically oriented in use.

3. Safety apparatus as claimed in claim 2 wherein said flexible member includes a cable attached to said actuating arm or rod adjacent the support means.

4. Safety apparatus as claimed in claim 3 wherein said support means is located behind the operator and includes a stop member so as to ensure that the actuating arm or rod is only capable of a limited forward movement upon movement of the harness or seat belt attached to the operator.

5. Safety apparatus as claimed in claim 4 wherein the actuating arm or rod is attached by biasing means to said support means so as to bias the actuating arm to the inoperative position.

6. Safety apparatus as claimed in claim 3 wherein the cable includes an inner cable which at its rearward end is attached to the lower end of the actuating arm, and an outer fixed cable which acts as a guide for movement of the inner cable.

7. Safety apparatus as claimed in claim 6 wherein the inner cable is attached at its forward end to a fuel pump control rod, said inner cable passing through a bracket or lug attached to the control rod and having a stop on its forward end, said stop engaging with the bracket when the inner cable is moved by movement of the actuating arm.

* * * * *